(12) United States Patent
Yamamoto et al.

(10) Patent No.: US 6,177,169 B1
(45) Date of Patent: Jan. 23, 2001

(54) OPTICAL INFORMATION RECORDING MEDIUM

(75) Inventors: Hiroki Yamamoto, Hitachi; Takashi Naito, Hitachioota; Takashi Namekawa, Hitachi; Yasutaka Suzuki, Juou-machi; Ken Takahashi, Tokai-mura; Motoyasu Terao, Hinode-machi; Toshimichi Shintani, Kodaira, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/432,782

(22) Filed: Nov. 3, 1999

Related U.S. Application Data (63) Continuation of application No. 09/090,382, filed on Jun. 4, 1998, now Pat. No. 5,985,401.

(30) Foreign Application Priority Data

Jun. 9, 1997 (JP) .................................................. 9-150646

(51) Int. Cl.[7] .................................................. B32B 3/02
(52) U.S. Cl. ........................ 428/64.1; 428/64.4; 428/426; 428/913; 501/53; 501/55; 501/68; 501/72
(58) Field of Search .................................. 428/64.1, 64.2, 428/64.4, 426, 428, 433, 913; 430/270.11, 945; 501/53, 55, 68, 72

(56) References Cited

U.S. PATENT DOCUMENTS

| 5,569,517 | | 10/1996 | Tominaga et al. . | |
|---|---|---|---|---|
| 5,604,002 | | 2/1997 | Tsujioka et al. . | |
| 5,817,389 | | 10/1998 | Ono . | |
| 5,827,790 | * | 1/2000 | Evans | 501/66 |
| 5,932,502 | * | 8/1999 | Longobardo | 501/70 |
| 6,009,724 | * | 1/2000 | Helsen | 65/17.3 |

FOREIGN PATENT DOCUMENTS

| 6-162564 | 6/1994 | (JP) . |
|---|---|---|
| 6-267078 | 9/1994 | (JP) . |
| 8-96412 | 4/1996 | (JP) . |

* cited by examiner

*Primary Examiner*—Elizabeth Evans
(74) *Attorney, Agent, or Firm*—Antonelli, Terry, Stout & Kraus, LLP

(57) ABSTRACT

A glass including $SiO_2$, $Na_2O$, MgO, $Al_2O_3$ and cobalt oxide, wherein the cobalt oxide is 4.5–85 wt % as an oxide of CoO or 4.9–91 wt % as an oxide of $Co_3O_4$.

9 Claims, 8 Drawing Sheets

ABSTRACT
OPTICAL INFORMATION RECORDING MEDIUM

CROSS REFERENCE TO RELATED APPLICATION

This is a continuation of U.S. application Ser. No. 09/090,382, filed Jun. 4, 1998, now U.S. Pat. No. 5,985,401 issued Nov. 16, 1999, the subject matter of which is incorporated by reference herein.

BACKGROUND OF THE INVENTION

The present invention relates to an information recording medium, and more particularly, to an optical information recording medium, which is capable of reading out or recording with a high recording density, and which has a high reliability in repeating recording and regeneration operations.

Conventionally, compact disks (CD), laser disks (LD), and the like are used widely as optical information recording media. Currently, a DVD, which has seven times the recording density of a CD, has come into practical use. The DVD is being developed as an erasable recording-regenerating medium in addition to a read only medium (DVD-ROM), wherein information is directly written onto the substrate. Furthermore, the practical use of a DVD as a RAM for a computer presently is under investigation.

With the DVD, high density recording can be achieved by using a laser having a shorter wave length, such as 650 nm, than the laser used for a CD (wave length approximately 780 nm). However, in order to handle a large amount of information, such as computer graphics and the like, it is necessary to achieve a higher recording density, such as 1.5 to 2 times that of the conventional high density recording. In order to achieve such a high recording density, a semiconductor laser of green to blue color having a shorter wave length (wave length 520–410 nm) than ever is under development.

As another means to achieve a higher recording density, a super resolution film can be employed. The super resolution film is a thin film formed at a lower plane of the recording medium, with which a high recording density can be achieved by the fact that it is able to decrease the size of the beam spot of the incident light passing through the film.

One of the mechanisms of the super resolution effect is an absorption-saturation phenomenon, which is a phenomenon utilizing non-linear optical characteristics of the super resolution film such that the film allows light having a larger intensity than the amount of its absorption-saturation to pass through the film and absorbs any light having an intensity less than the amount of its absorption-saturation. The spatial intensity of a laser beam utilized in reading and writing has a Gaussian distribution. Therefore, when the laser light beam passes through the super resolution film, the laser light in the lower end portion of the Gaussian distribution, where the intensity is low, is absorbed by the film, and the laser light in the middle portion of the Gaussian distribution, where the intensity is high, passes through the film. Accordingly, the diameter of the laser beam is reduced as it passes through the super resolution film.

An organic thin film made of a material in the phthalocyanine group, as disclosed in JP-A-8-96412 (1996), chalcogenide, fine particles of a compound semiconductor, and the like are known at the present as materials which may be used for the super resolution film described above. Additionally, trials to use some organic materials, such as thermochromic materials of the type disclosed in JP-A-6-162564 (1994), and photochromic materials of the type disclosed in JP-A-6-267078 (1994), as the super resolution film have been carried out.

However, the above-mentioned materials have problems in reliability and productivity. That is, there has been a concern about gradual deterioration of the organic thin film after repeated recording and regenerating operations, because the energy density of a laser beam is locally increased significantly during the recording and regenerating operations. Therefore, a sufficient guarantee period for the recording and regenerating operations is scarcely obtained under a severe condition of use, wherein the recording and regenerating operations are performed frequently, such as when the disk is used as a RAM and the like for computers.

On the other hand, chalcogenide is chemically unstable, and so a long guarantee period can not be obtained for this material, and the fine particles of a compound semiconductor provide difficulties during the production process.

SUMMARY OF THE INVENTION

One of the objects of the present invention is to provide an optical recording medium having a super resolution film, which can guarantee repeated recording and regenerating operations for a sufficiently long time, and which has a preferable productivity and a high resolution effect.

A first aspect of the present invention to solve the above issues is an optical information recording medium comprising a substrate, whereon a recording layer for recording information is formed; and a glass thin film, formed onto the substrate, having a characteristics such that the intensity distributions of irradiated light onto the glass and transmitted light through the glass vary in a non-linear manner.

The substrate is desirably transparent to light, and for instance, is made of inorganic materials, such as glass and the like, and organic materials, such as polycarbonate, polyethylene terephthalate, and the like are also desirable. Here, the term glass refers to amorphous solid oxides and general amorphous materials containing the above oxide as a main component.

Forming on a substrate includes both forming onto the surface of a substrate directly and forming onto the surface of a substrate indirectly via another layer, for instance, a protection layer.

In accordance with the above composition, an information recording disk, which has a large capacity, and which experiences less deterioration after repeated reading out and writing, can be provided.

In the first aspect of the invention, the recording layer can be provided with a pit pattern representing the recording information. The pit pattern is a device by which the information is recorded in accordance with the arrangement of pits provided onto the surface of the substrate. If this recording method is employed, the recorded information can not be rewritten. However, once a master die of the substrate having this recorded information is made, a large number of substrates with the same information can be manufactured readily. Therefore, this recording method is used for recording movies, music, and computer programs.

The recording layer of the invention can also be a device for recording information with optical energy. For recording information with optical energy, an information recording substrate using so-called phase changing organic materials or inorganic materials, the crystalline structure of which varies when irradiated by light, is used as the recording layer.

A second aspect of the present invention is an optical information recording medium comprising at least a substrate, a recording layer for recording information formed on the substrate, and a reflecting film for reflecting light formed on the recording layer, wherein the substrate is made of glass, the optical transmittance of which increases in a non-linear manner corresponding to an increase in intensity of the irradiated light.

In accordance with the above composition, a reflection type information recording disk, which has a large capacity and less deterioration after repeated reading out and writing, can be provided.

This second aspect of the invention provides an information recording substrate of a type, which reflects incident light with a reflecting film provided at a lower portion of the recording film, and reads the information with reflected light.

The glass in the first or the second aspects of the invention desirably contains at least an element selected from transition metal elements and rare earth metal elements.

For the above transition metal elements and the rare earth metal elements, particularly, at least an element selected from the group consisting of Ti, V, Cr, Mn, Fe, Co, Ni, Nd, Ce, Pr, Sm, Eu, Tb, Ho, Er, and Tm is desirable.

When the transition metal element or the rare earth metal element forms a glass film, the metal element is desirably contained in the range from 20% by weight to 90% by weight as an oxide to the total weight of the glass. When the metal element forms a glass substrate, the metal element is desirably contained in the range from 0.1% by weight to 29% by weight as an oxide to the total weight of the glass.

In the first aspect of the invention, the glass desirably contains as oxide the following compounds: $SiO_2$: 6–80% by weight, $R_2O$: 0–20% by weight ®=alkali metal element), $B_2O_3$: 0–30% by weight, and CoO: 20–90% by weight.

In the second aspect of the invention, the glass desirably contains cobalt oxide as CoO in the range of 0.1–29% by weight.

A third aspect of the present invention is an information recording medium comprising at least a substrate, whereon a recording layer for recording information is formed, and a super resolution layer formed on the substrate, the optical transmittance of which increases in a non-linear manner corresponding to an increase in the intensity of the irradiated light, wherein an output maintaining rate of the information recording medium after repeating the recording by $10^4$ times is at least 90%.

The output maintaining rate is a value indicating how much of the intensity of the electrical signal is maintained after repeating the recording and regeneration by $10^4$ times, taking the intensity of the electrical signal at the first regeneration of information after performing the first recording with irradiation of light as 100%. If the super resolution film is deteriorated by repeating the irradiation of light, the spot size of the laser ray which reaches the recording layer is expanded, and, as a result, the electric output is decreased. That means that a super resolution film which can maintain the initial output maintaining rate as long as possible is desirable.

Furthermore, in accordance with a fourth aspect of the present invention, an information recording medium is provided, which comprises a transparent substrate, and a recording layer for recording information which is formed onto the substrate, wherein an output decrease in recorded signal at a frequency of 8 MHz is less than −30 dB of the output at 1 kHz, and an output maintaining rate after repeating the recording by $10^4$ times is at least 90%.

Figure 8:
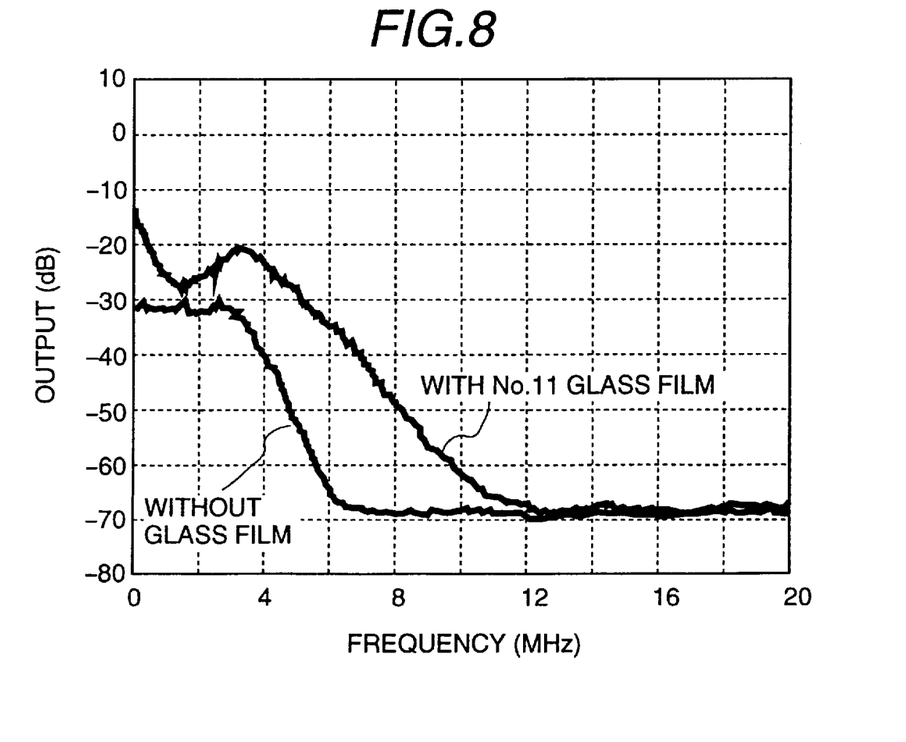
FIG. 8 is a graph indicating a reading out frequency dependence of an output obtained from the ROM disk shown in FIG. 7.

FIG. 8 is a graph indicating a relationship between the recording frequency and the output for the information recording media with and without the super resolution film of the present invention. The medium with the super resolution film can record signals of higher frequency components, because the spot size of the laser beam reaching the recording layer is decreased. The above composition indicates an index which represents how high a frequency component can be recorded.

In accordance with a fifth aspect of the present invention, glass comprising $SiO_2$: 6–80% by weight, $R_2O$: 0–20% by weight ®=an alkali metal element), $B_2O_3$: 0–30% by weight, CoO: 20–90% by weight, as equivalent oxide, respectively, is provided.

The above glass can be mounted not only on a photo disk, but also on various media, as a film having the super resolution effect. For instance, a display apparatus, which generates light when its fluorescent body is irradiated with a laser ray so as to be excited, can produce a high resolution display by mounting the grass film of the present invention onto a surface of the fluorescent body, because the spot size of the laser ray can be converged.

In accordance with a sixth aspect of the present invention, a glass thin film containing cobalt oxide in the range of 20–90% by weight as equivalent CoO is provided.

In the case of this glass film, the upper limit of the CoO content is restricted, because, if CoO is added excessively, the CoO is precipitated, and causes devitrification.

BRIEF DESCRIPTION OF THE DRAWINGS

The above and further objects and novel feature of the present invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS (Embodiment 1)

Details of the present invention will be explained hereinafter with reference to various preferred embodiments.

The composition of a number of glass targets investigated in the development of the present invention is indicated in Table 1.

The glass block for the target was obtained by the steps of weighing a designated amount of powdered raw materials, charging the powdered raw materials into a crucible made of platinum, heating the crucible to approximately 1500° C. in an electric furnace to melt the raw materials, and pouring the molten glass into a graphite mold, which was pre-heated to approximately 400° C. After the raw materials were molten completely, the molten material was cooled rapidly, a stress relief was performed by reheating the material to approximately 600° C. and then cooling it gradually, followed by polishing the back side of the obtained glass block.

The sintered target was obtained by the steps of granulating a designated amount of powdered raw materials, fabricating the powder into a fabricated body in a die, and hot pressing the fabricated body at a designated temperature after dewaxing. The temperature for heat treatment was 900° C. when the cobalt raw material was $Co_3O_4$, and was 1200° C. when the cobalt raw material was CoO.

As a previous step the evaluation of the shape of the disk, a glass sample for a preliminary test in the shape of a thin

TABLE 1

| No. | Composition (% by weight) | | | | | | | Target (kind) | Film Q[1)] |
| --- | --- | --- | --- | --- | --- | --- | --- | --- | --- |
| | $SiO_2$ | $Na_2O$ | CaO | MgO | $Al_2O_3$ | $Co_3O_4$ | CoO | | |
| 1 | 70.4 | 13.6 | 7.8 | 4.0 | 1.3 | 2.9 | — | glass | ○ |
| 2 | 69.0 | 13.3 | 7.6 | 3.9 | 1.3 | 2.9 | glass | ○ | |
| 3 | 51.8 | 10.0 | 5.7 | 2.9 | 1.0 | 28.6 | — | glass | ○ |
| 4 | 45.3 | 8.8 | 5.0 | 2.6 | 0.9 | 37.4 | | sint[2)] | ○ |
| 5 | 29.0 | 5.6 | 3.2 | 1.6 | 0.6 | 60.0 | | sint | ○ |
| 6 | 14.5 | 2.8 | 1.6 | 0.8 | 0.3 | 80.0 | | sint | ○ |
| 7 | 5.9 | 1.4 | 0.5 | 0.2 | 0.1 | 91.9 | | sint | X |
| 8 | — | — | — | — | — | 100 | | sint | X |
| 9 | 51.8 | 10.0 | 5.7 | 2.9 | 1.0 | — | 28.6 | glass | ○ |
| 10 | 29.0 | 5.6 | 3.2 | 1.6 | 0.6 | — | 60.0 | sint | ○ |
| 11 | 14.5 | 2.8 | 1.6 | 0.8 | 0.3 | — | 80.0 | sint | ○ |
| 12 | 5.9 | 1.4 | 0.5 | 0.2 | 0.1 | — | 91.9 | sint | X |
| 13 | — | — | — | — | — | — | 100 | sint | X |

Remarks:

1): Film quality 2) sintered target

In Table 1, the column indicating the film quality was provided with O when a uniform film was obtained in view of transparency, uniformity, and the like, and with X when the obtained film was not uniform.

In the present embodiment, a soda-lime group glass was used as a mother glass, and a cobalt oxide, which had a large absorption in the vicinity of 650 nm, was used as the transition metal. As raw materials for the cobalt oxide, $Co_3O_4$ and CoO were used.

The targets No. 1–No. 7 are composed of soda-lime glass and $Co_3O_4$. Among them, targets No. 1–No. 3 were targets in the form of a glass block, because they were vitrified. Targets No. 4 No. 7 were not vitrified, because the content of $Co_3O_4$ was too much to be vitrified. Therefore, a sintered body of a mixture of glass powder and $Co_3O_4$ was prepared as a sintered target.

Target No. 8 is a comparative example of a sintered target made of only $Co_3O_4$.

In targets No. 9–No. 13, CoO was used as the raw material for cobalt oxide. In these cases, target No. 9 was a glass target, because target No. 9 had a Co content of 28.6% by weight and was vitrified. Because targets No. 10–No. 12 were not vitrified, a sintered target of the mother glass raw material and CoO was used.

Figure 2:
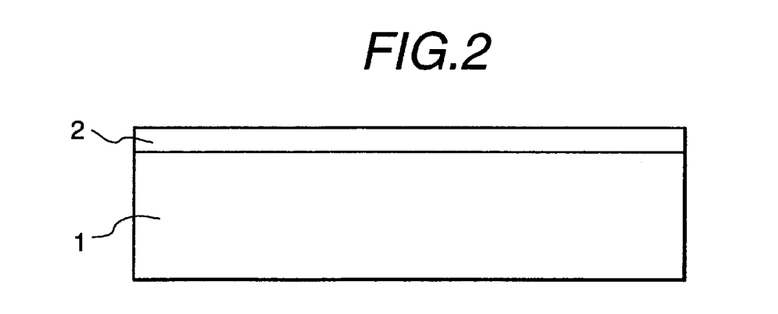
FIG. 2 is a schematic cross section of a simulated sample according to the present invention.

Target No. 13 is a comparative example of a sintered target made of only CoO.

film as shown in FIG. 2 was prepared, and fundamental material characteristics of the glass thin film were determined. In FIG. 2, the numeral 1 indicates a substrate, and the numeral 2 represents the glass thin film. In the present investigation, a soda-lime glass 0.55 mm thick and 30 mm square was used as the substrate 1.

The structure of the prepared film was evaluated by a thin film X-ray diffraction method. Then, it was found that all the prepared films were amorphous regardless of whether the target was glass or a sintered body, and that glass films were formed.

Figure 3:
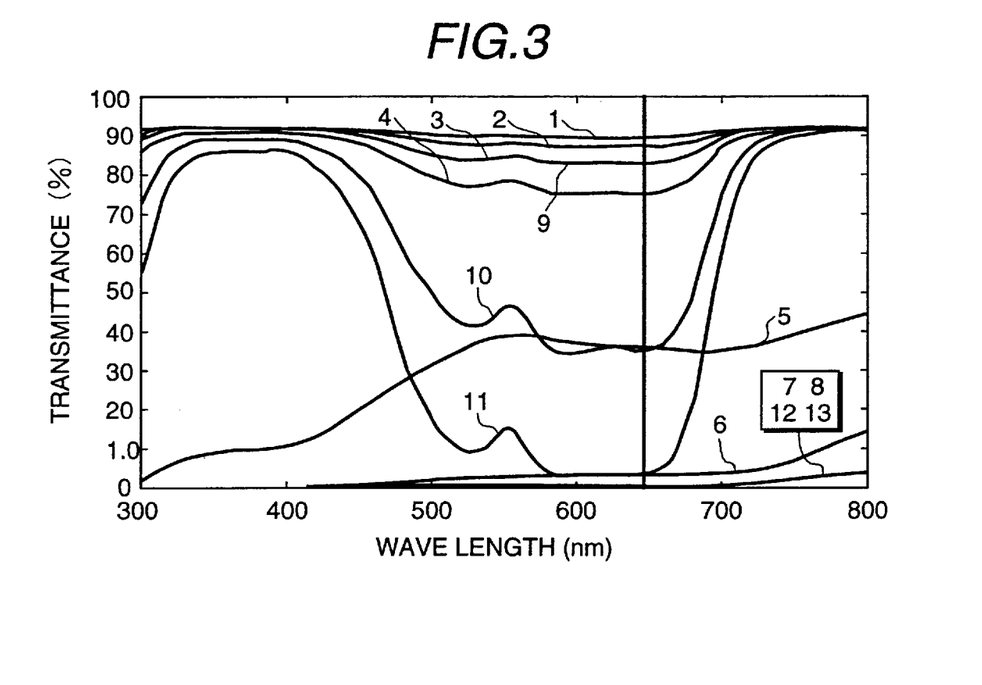
FIG. 3 is a graph indicating a dependency of transmittance on wave length of the glass thin film according to the present invention.

FIG. 3 indicates the dependence of the transmittance of the glass thin films formed using the targets shown in Table 1 on wave length. The transmittance was measured using monochromatic light obtained by treating white light from a light source with a monochromator. In accordance with target No. 1, the peak indicating an absorption was hardly observed around 300 nm, because of too small a content of $Co_3O_4$. In accordance with targets No. 2–No. 4, the peak indicating the absorption by Co could be observed, even though it is small, in the region of 500 nm–700 nm. No. 3 glass had a transmittance of approximately 85% at a wave length of 650 nm.

With the thin films of targets No. 5 and 6, the values of the transmittance were sufficiently low. However, the transmittance was decreased in accordance with decreasing wave length, and it was indicated that the decrease in the transmittance was caused by scattering. The glass of target No. 7 and the $Co_3O_4$ of target No. 8 had a sufficiently low transmittance. However, they were reduced in a spattering atmosphere, and a film having a metallic luster was obtained. Therefore, the transmittance was decreased by reflection.

On the other hand, in accordance with the glasses of targets No. 9–No. 11, using a raw material of CoO, a peak indicating absorption by Co was observed in the vicinity of the region of 500 nm–700 nm. The transmittance was decreased in accordance with the increase in Co content. The thin film of target No. 11 containing 80% of Co had a transmittance of approximately 5% at wave length of 650 nm. The glass of target No. 12 containing CoO of 91.9%, and the film of target No. 13, which was 100% CoO, indicated the same results as target No. 8.

Figure 4:
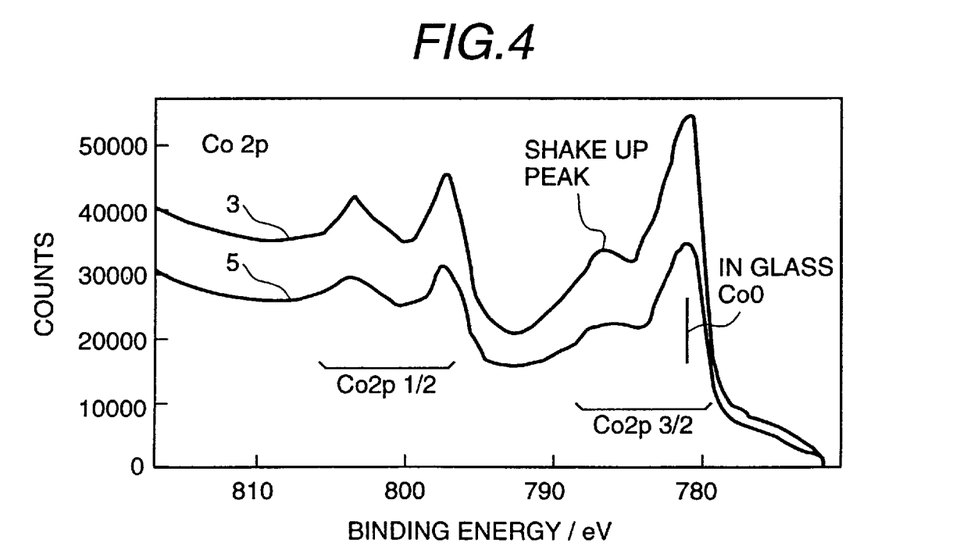
FIG. 4 is a diagram showing an XPS of Co of a glass thin film according to the present invention.

In order to investigate the difference in spectrum of the transmittance curves in FIG. 3, the valence and oxide conditions of the Co were analyzed by XPS. The XPS spectra of Co in the thin films of targets No. 3 and 5 are indicated in FIG. 4. In the spectrum of the thin film of target No. 3, a peak called a shake up peak exists around 786 eV. It indicates the presence of a large amount of $Co^{2+}$. On the contrary, the shake up peak can not be observed in the spectrum of the thin film of target No. 5. It indicates an oxide condition of $CO_3O_4$ coexisting with $CO^{3+}$. Accordingly, scattering occurred, and the profile indicated in FIG. 3 was obtained.

The same investigation was performed with other thin films, and it was found that, if cobalt existed in the condition of $Co^{2+}$, the spectrum included the peak of absorption typical for Co, such as in targets No. 2, 3, 10, and 11, and, if $Co^{3+}$ existed, the spectrum became a curve accompanied with scatter, such as in targets No. 5 and 6.

Figure 5:
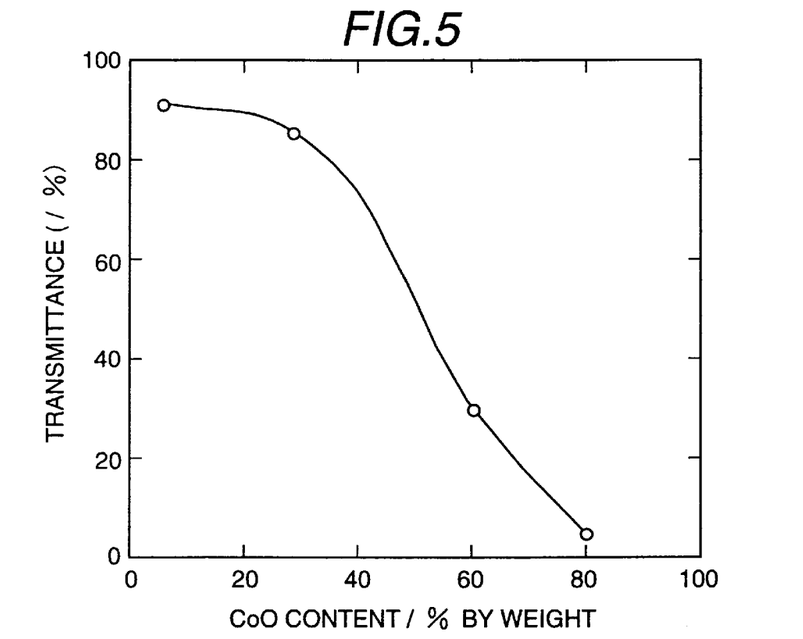
FIG. 5 is a graph indicating a relationship between transmittance for light of 650 nm and CoO content.

FIG. 5 indicates the relationship between the plotted transmittance at a wave length of 650 nm versus the Co ion content in a target based on the thin film transmittance curves of targets No. 2, 3, 10, and 11. The transmittance was decreased in accordance with increasing CoO content, and the transmittance became approximately 30% when the CoO content was 60%.

Then, in order to evaluate the Co content in the prepared glass thin films, a composition analysis of the film was performed with a secondary ion mass spectrometer (SIMS). A plate cut out from the glass having the same composition as the target was used as a substrate, and a thin film having the same composition was spattered onto the substrate. The analysis was performed from a film forming direction to a depth direction, so that the compositions of the film and the substrate could be evaluated continuously. In the present embodiment, the investigation was performed using target No. 3 as the target composition.

Figure 6:
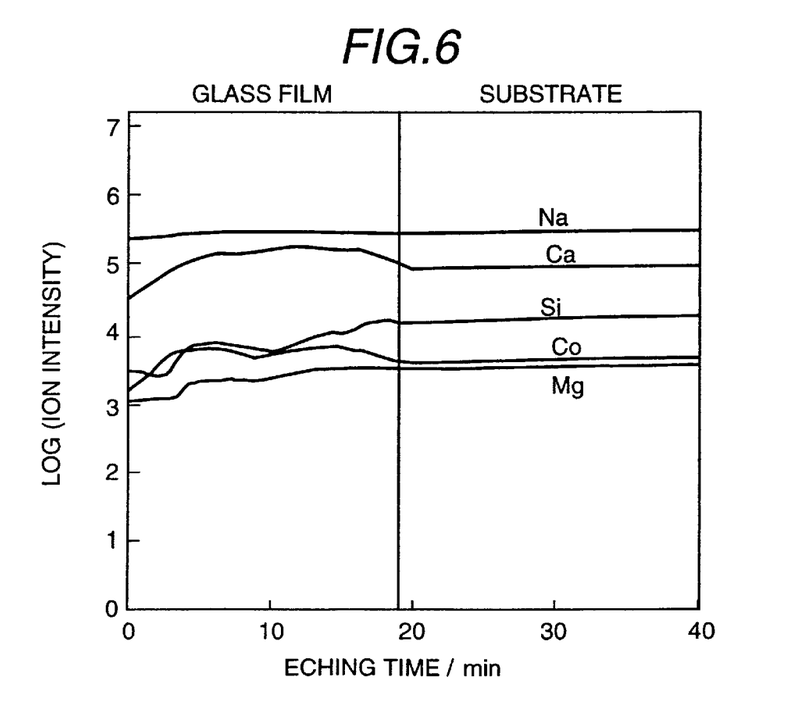
FIG. 6 is a diagram showing a SIMS of a glass thin film formed onto a glass substrate having a target composition.

The results of the analysis are indicated in FIG. 6. It was found that the Co content in the thin film was larger than that in the substrate. The Si content in the thin film was smaller then that in the substrate. However, the amounts of change were small, and a large deflection in the composition could not be expected. Therefore, the film composition can be regarded approximately as being the same as that of the target composition.

In accordance with the above investigation, the Co oxide content in the glass thin film is desirably in the range of from 4.5% by weight to 85% by weight as an oxide of CoO, and of from 4.9% by weight to 91% by weight as an oxide of $CO_3O_4$. If CoO is less than 4.5% by weight, it is difficult to obtain a sufficient absorption of light. If CoO exceeds 85% by weight, the film bears a metallic luster, and the transmittance is decreased.

(Embodiment 2)

Then, the super resolution effect was evaluated by manufacturing ROM disks, whereon the glass film of the present invention was formed.

Figure 15:
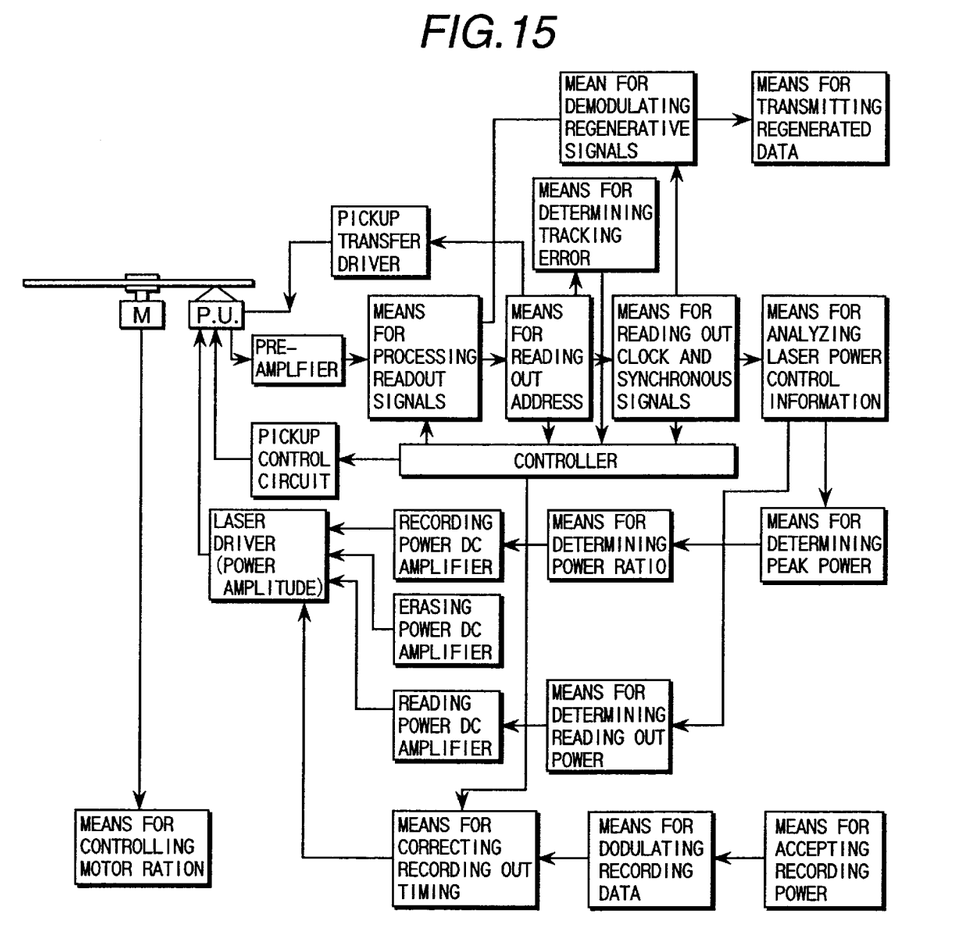
FIG. 15 is a block diagram of an apparatus using the photo disk of the present invention.

FIG. 15 is a block diagram of an example of the optical recording apparatus used with the optical disk of the present invention. Using the optical recording apparatus having the above composition, the performance of the ROM disk of the present invention was evaluated. The same apparatus was used on other embodiments.

Figure 7:
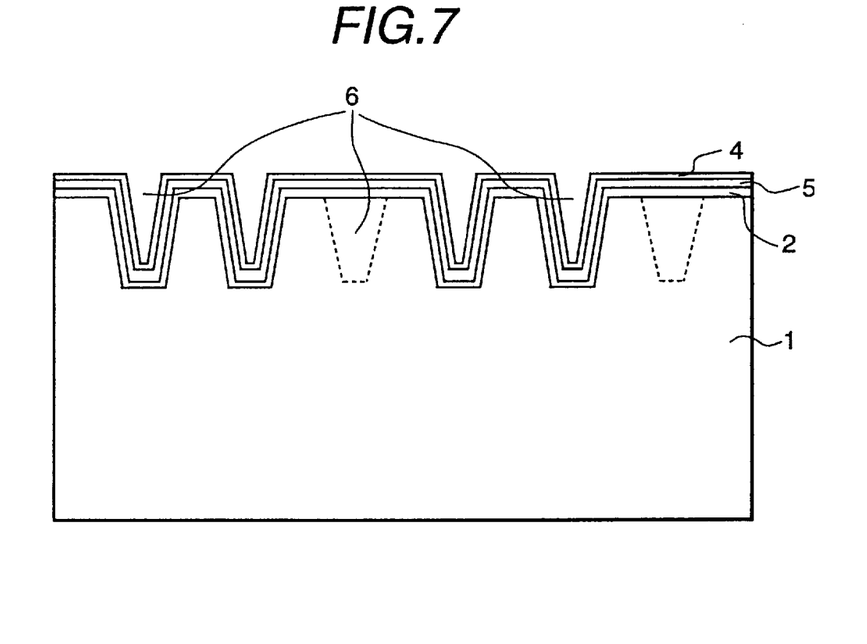
FIG. 7 is a schematic cross section of a ROM disk according to the present invention.

FIG. 7 indicates a schematic cross section of the manufactured ROM disk. In FIG. 7, the disk includes a polycarbonate substrate 1, a glass thin film 2, a $SiO_2$ protective film 5, and a Al reflector 4, and pits 6 represent stored information.

The ROM disk was manufactured by the following steps First, a pit pastern representing information was formed onto a photoresist by a laser. The pit pattern was duplicated onto a Ni die, and substrates were formed by injection molding polycarbonate into the Ni die. A glass film 160 nm thick was formed onto the substrate by spattering, and after a $SiO_2$ protective film of 140 nm thick was formed thereon, an aluminum reflecting film 100 nm thick was formed. In the present embodiment, the target No. 11 film was formed as the glass thin film. As a comparative example, a ROM disk without forming the glass film also was manufactured.

The frequency dependency of the regenerating output intensity of the manufactured ROM disk was analyzed with a spectrum analyzer. The results are indicated in FIG. 8. The regenerated laser power is 4 mW. It was revealed that, in a case when the glass thin film of target No. 11 was formed, the output level was high until frequency components became higher than a case when the glass thin film was not formed. Since the high frequency components of a signal are written with a finer pit pattern on the ROM disk, the above result indicated that the output was regenerated by reading out a finer pit pattern when the glass film was formed. Therefore, it was found that, when the glass film was formed, the super resolution effect had been obtained.

The same investigations as the above were performed on other glass films in Table 1, and the same super resolution effect was confirmed on the glass films of targets No. 3–6, and No. 9–11.

Figure 1:
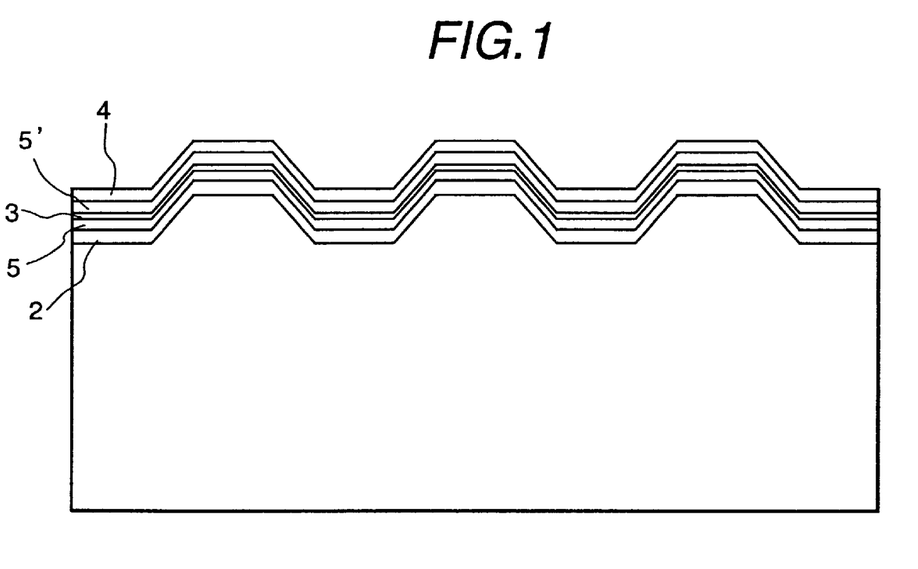
FIG. 1 is a schematic cross section of a RAM disk according to the present invention.

Then, a RAM disk, wherein the glass thin films investigated above were formed on the substrate, was manufactured, and its characteristics were evaluated. A schematic cross section of the RAM manufactured in accordance with the present invention is indicated in FIG. 1. In FIG. 1, the disk includes a polycarbonate substrate 1, a glass super resolution film 2, a recording film 3, a reflecting film 4, and protective films 5, 5'. In accordance with the present invention, a circular plate 0.6 mm thick and 120 mm in diameter was used as the polycarbonate substrate 1. A glass film 300 nm thick was formed thereon by a spattering method to form the super resolution film 2. After forming a ZnS—$SiO_2$ protective film 80 nm thick thereon, a Ge—Sb—Te group phase changing film representing the recording film was formed approximately 20 nm thick thereon by the same spattering method. Then, after forming a protective film approximately 90 nm thick, an AlTi reflecting film 200 nm thick was formed thereon.

The glass thin film was formed by the following steps. That is, a glass block or a sintered body 5 mm in thickness and 120 mm in diameter was manufactured as a target, and a backing plate made of copper was adhered onto the back side of the target with an organic adhesive agent for vacuum. Spattering was performed using Argon gas. The power was 200 mW. The film was formed uniformly by rotating the substrate during the spattering. In the present embodiment, the sample target No. 11 was used as the glass film. As a comparative example, a RAM disk, whereon the grass film was not formed, was manufactured.

Figure 9:
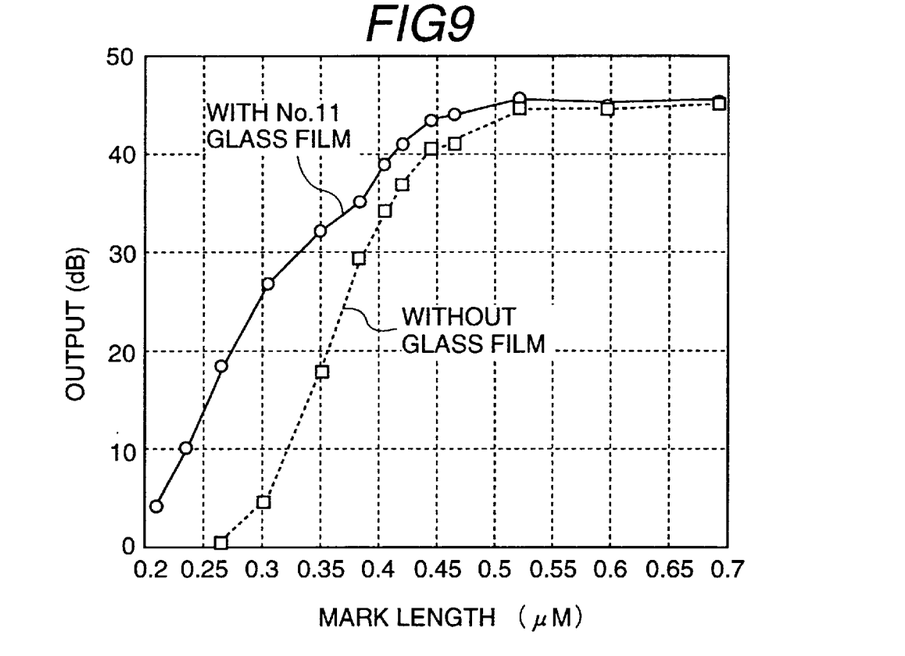
FIG. 9 is a graph indicating a relationship between mark length and variation in output obtained from the RAM disk shown in FIG. 1.

FIG. 9 indicates a relationship of recording mark length versus regenerating output intensity of the RAM disk, whereon recording marks of the same shape were formed with an equal interval. The laser power for reading out was 2 mW. In accordance with FIG. 9, it was revealed that the present embodiment, whereon the glass film of target No. 11 was formed, had higher regenerating outputs than the comparative example, which did not have the glass film, in the shorter mark length region. Therefore, it was revealed that regeneration was possible to the shorter mark length when the glass film is formed. Accordingly, the super resolution effect could tee confirmed with the RAM disk.

The same results as the case of the RAM disk were obtained when all the glass films shown in Table 1 were investigated.

Figure 14:
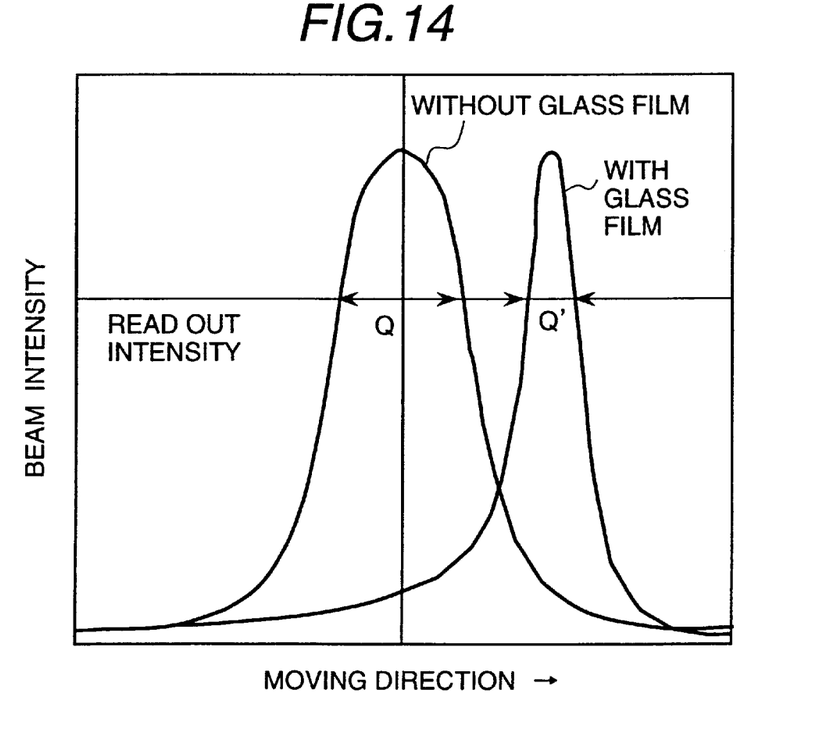
FIG. 14 is a graph indicating variations of laser beam diameter when the glass film of the present invention is formed and not formed.

Then, a spatial intensity distribution of the reflecting light in the cases when the above super resolution effect was obtained were investigated. FIG. 14 indicates schematically the intensity distribution of laser light in the laser beam forwarding direction both in the case when the glass film was formed and the super resolution effect was obtained, and in the case when the glass film was not formed. In accordance with FIG. 14, it was revealed that the spatial intensity distribution was approximately a Gaussian distribution in the case when the grass film was not formed, but the distribution of the beam was deflected toward the laser beam forwarding direction when the glass film was formed.

Simultaneously, it was revealed that the beam diameter Q' at the beam intensity necessary for reading out became smaller in comparison with the case when the glass film was not formed.

In accordance with the above results, it was revealed that the intensity and the intensity distribution of the reading out light could be varied by using the grass film such as provided in the present embodiment. Furthermore, it was revealed that the super resolution effect could be obtained in the above case.

(Embodiment 3)

Next, deterioration of the film by repeated regeneration was evaluated. The evaluation was performed by repeatedly irradiating the manufactured RAM disk with a regeneration signal light and detecting the regenerated output. The pit pitch was 0.3 $\mu$m. The glass thin film of target No. 11 was used. As a comparative example, a phthalocyanine group organic thin film was selected, and the same evaluation was performed.

Figure 10:
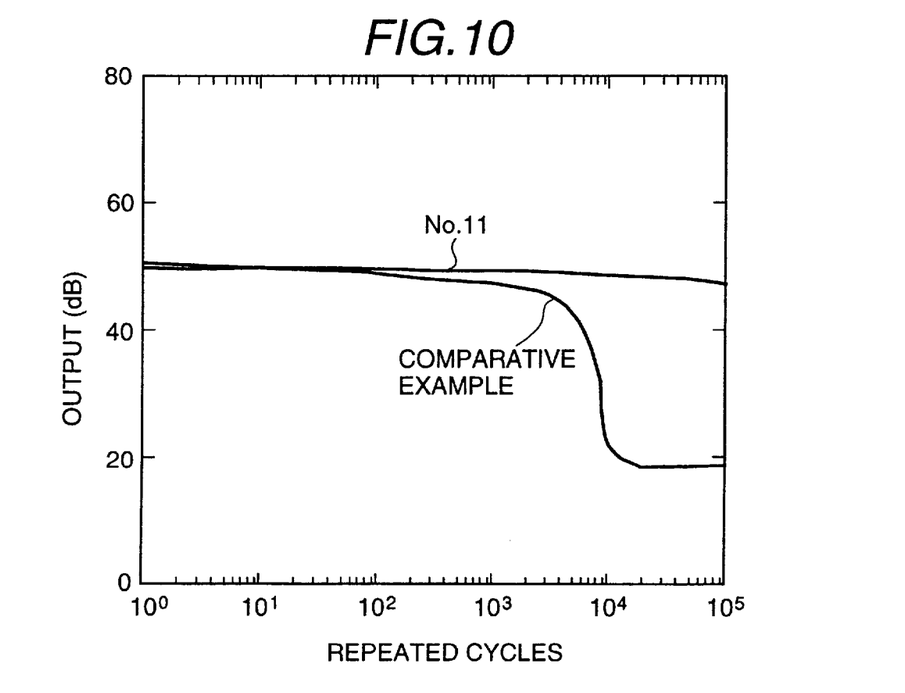
FIG. 10 is a graph indicating a dependency of output on the repeating of operations on the RAM disk shown in FIG. 1.

FIG. 10 indicates a relationship between the output versus the repeated number of operations. In accordance with FIG. 10, it was revealed that the output of the disk formed with the organic group thin film was decreased gradually over the repeated regenerations approximately 10,000 times. On the contrary, the output of the disk formed with the glass thin film of the present invention was hardly decreased by repeating the regeneration over 10,000 times. As explained above, it was revealed that the optical disk of the present invention maintained the super resolution effect even after repeated regeneration.

The high stability against repeated regeneration could be obtained when the glass thin film, with which the super resolution effect was obtained in the above embodiment 2, among other glass films in Table 1, was used as the glass thin film.

(Embodiment 4)

Figure 11:
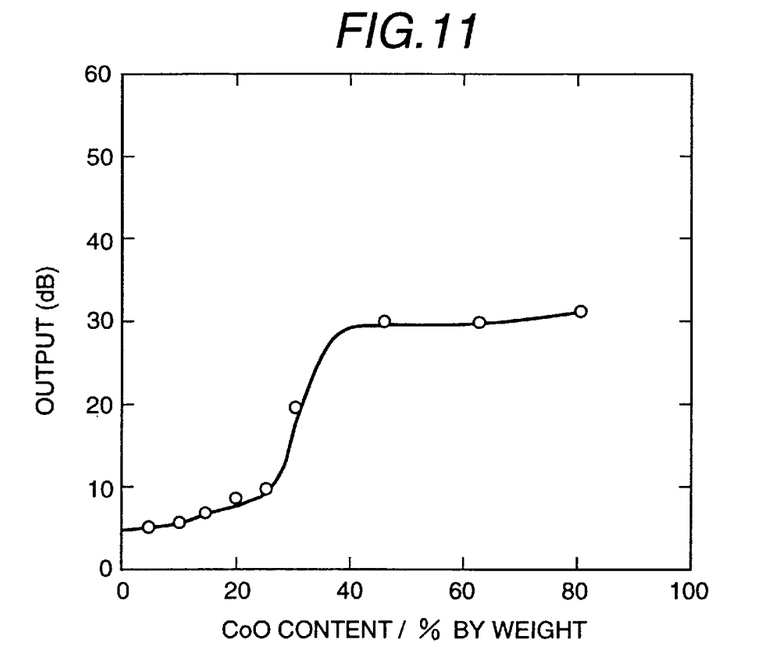
FIG. 11 is a graph indicating a relationship between CoO content and variation in reading out of the output obtained from the RAM disk shown in FIG. 1.

Then, the composition of the glass thin film was investigated. First, paying attention to the content of cobalt oxides in the glass film, a relationship between the cobalt content and the output power was investigated by manufacturing the same RAM disk as the disk in the embodiment 2. The mark length was 0.3 $\mu$m. The laser power was 2 mw. FIG. 11 indicates a relationship between the cobalt consent and the output. The output power was increased in accordance with an increasing cobalt content, and it was found that a high output could be obtained even with a small mark length. In other words, it was found that the super resolution effect could be increased in accordance with an increasing cobalt content. Furthermore, it was found that the output exceeded 5 dB when the cobalt content was equal to or more than 20%, in which case it was possible to beat the output as a signal. However, when the cobalt content was less than 20%, the output was less than 5 dB, and it was impossible to beat the output as a signal.

The ROM disk shown in FIG. 7 was manufactured, and the output to the high frequency component was evaluated by a spectrum analyzer. Then, it was revealed that the high frequency component could be read out when the cobalt content was equal to or more than 20%, but when the cobalt content was less than 20%, any significant effect of adding cobalt could not be observed.

In accordance with the above investigation, the cobalt content desirably should be equal to or more than 20% by weight in any ease of both a ROM and a RAM. In accordance with the investigation in the embodiment 1, the cobalt content desirably should be equal to or less than 91% by weight.

Furthermore, chemical elements to be contained in the glass film were investigated. The mother glass was soda lime glass. The glass containing an oxide of at least one element selected from the group consisting of Ti, V, Cr, Mn, Fe, Co, Ni, and Cu among transition metallic elements, and Nd, Ce, Pr, Sm, Eu, Tb, Ho, Er, and Tm among rare earth elements had an absorbing spectrum typical of the respective element, and the same super resolution effect as the embodiment 2 could be obtained by using a laser beam having a wavelength band capable of absorption.

In accordance with the above results, an optical disk having the super resolution effect could be obtained by using the glass thin film containing at least one element selected from the group consisting of Ti, V, Cr, Mn, Fe, Co, Ni, Cu, Nd, Ce, Pr, Sm, Eu, Tb, Ho, Er, and Tm among transition metallic elements and rare earth elements.

Next, the composition of the mother glass was investigated. In the above embodiments, soda lime glass was used as the mother glass. However, the same effect could be obtained by using borosilicate glass containing boron. However, when the content of $SiO_2$ was less than 6% by weight, the stability as glass was low, and crystallization and the like could occur when containing an oxide of the transition element or the rare earth element. When the content of $SiO_2$ exceeded 80% by weight, the above oxide could be hardly included into the glass structure, and it was difficult to obtain a stable glass. In accordance with the above results, the content of $SiO_2$ desirably should be in the range from 6% by weight to 80% by weight.

When the content of alkaline oxide in the glass exceeded 20% by weight, the durability of the glass decreased, and obtaining a stable glass was difficult. Accordingly, the content of the alkaline oxide desirably should be equal to or less than 20% by weight.

Furthermore, when the consent of boron oxide in the glass exceeded 30% by weight, the oxide of the transition metal or the rare earth element was hardly included in the glass structure, and obtaining a stable glass was difficult. Therefore, the content of boron oxide desirably should be equal to or less than 30% by weight.

In addition to the above indispensable components, an oxide of alkaline earth elements, alumina, zirconia, and the like are desirably contained in the glass as a glass stabilizing agent.

(Embodiment 5)

Figure 12:
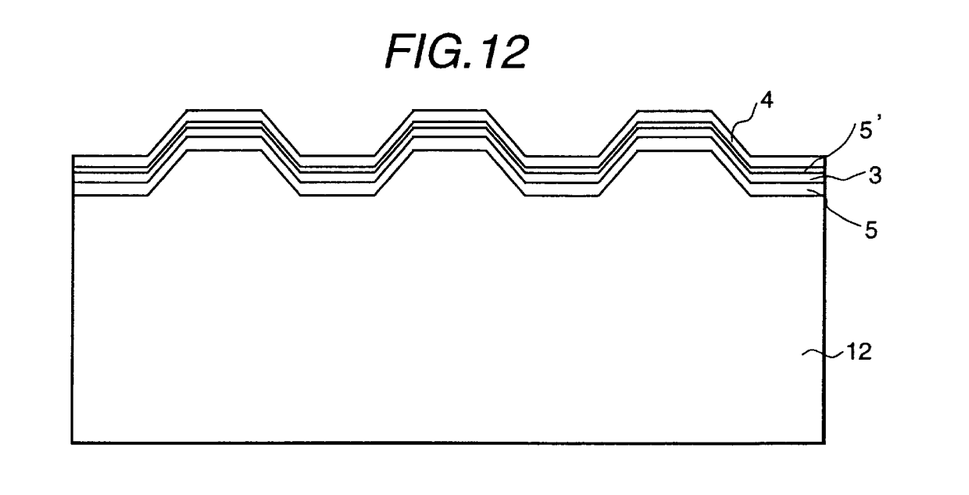
FIG. 12 is a schematic cross section of a RAM disk according to the present invention.
Figure 13:
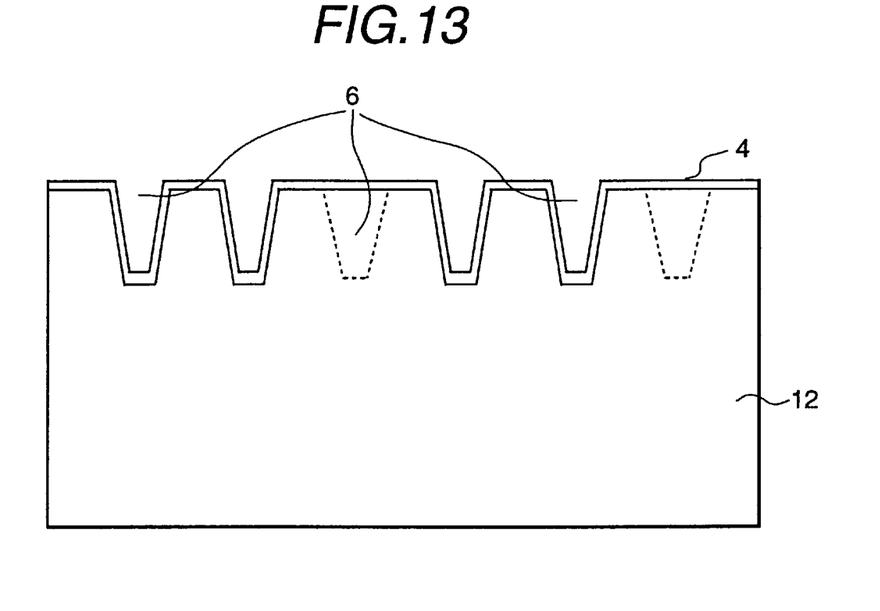
FIG. 13 is a schematic cross section of a ROM disk according to the present invention.

Next, the super resolution effect was investigated by manufacturing glass substrates containing a transition metallic element. FIG. 12 indicates schematically a cross section of a manufactured RAM disk. In FIG. 12, the disk includes a glass substrate 12, a recording film 3, a reflecting film 4, and protective films 5, 5'. The thickness of the substrate was 0.6 mm, and a track was formed onto the surface of the substrate by reactive ion etching using a photoresist as a mask. FIG. 13 indicates schematically the cross section of the ROM disk manufactured using the same substrate. In FIG. 13, the disk includes a glass substrate 12, a reflecting film 4, and a recording mark 6 representing written information. In the present embodiment, soda lime glass was used as the mother glass, and CoO was contained therein as the transition metallic oxide. The super resolution effect was investigated using the same evaluating method as the embodiment 2 by varying the consent of CoO in the range of 0.01–30% by weight.

The composition of the manufactured glass substrate, the evaluated results in vitrification and the super resolution are indicated in Table 2. In the evaluated results of the vitrification, the case when glass was formed without causing crystallization was indicated with O, and the case when crystallization or devitrification was caused was indicated with X. The-evaluated results of the super resolution effect were indicated by the mark length of 0.3 μm and the output at the space length. The reading out laser wavelength was 650 nm.

TABLE 2

| No. | Composition (% by weight) | | | | | | Vitri-fication | S.R.E. (output/dB)*1 |
|---|---|---|---|---|---|---|---|---|
| | $SiO_2$ | $Na_2O$ | CaO | MgO | $Al_2O_3$ | CoO | | |
| 14 | 72.5 | 14.0 | 8.0 | 4.1 | 1.4 | 0.01 | o | 5 |
| 15 | 72.5 | 14.0 | 8.0 | 4.1 | 1.4 | 0.05 | o | 5 |
| 16 | 72.5 | 14.0 | 8.0 | 4.1 | 1.4 | 0.10 | o | 10 |
| 17 | 71.8 | 13.9 | 7.9 | 4.0 | 1.4 | 1.00 | o | 16 |
| 18 | 65.9 | 12.7 | 7.3 | 3.7 | 1.3 | 9.1 | o | 33 |
| 19 | 51.8 | 10.0 | 5.7 | 2.9 | 1.0 | 28.6 | o | 41 |
| 20 | 50.7 | 9.8 | 5.6 | 2.9 | 1.0 | 30.0 | X | — |
| 21 | 66 | 9 | $B_2O_3$ 9 | 1 | 5 | 10.0 | o | 33 |
| 22 | 49 | 9 | 26 | 1 | 5 | 10 | o | 35 |
| 23 | 43 | 9 | 32 | 1 | 5 | 10 | X | — |

Remarks: *1: Super Resolution Effect

In accordance with the specimens No. 14–19, and 21–23, no crystallization nor devitrification were observed, and stable glasses could be manufactured. The glass of specimen No. 20 caused a phase separation after pouring, and so a stable glass could not be obtained.

In view of the above result, the content of Coo in the glass desirably should be equal to or less than 29%.

The glasses of specimen No. 21–23 were the same as the glasses of specimen No. 14–19, except for replacing their CaO with $B_2O_3$.

Regarding the regenerating output, outputs not less than 10 dB could be obtained when the cobalt content was equal to or more than 0.10% by weight, and it was possible to read them out as signals. On the contrary, when the cobalt content was equal to or less than 0.05% by weight, the outputs were as small as less than 5 dB, and it was impossible to read them out.

In accordance with the above results, the content of cobalt desirably should be in the range of 0.10–29% by weight. The above effects were similar with the glasses which contained $B_2O_3$ instead of CaO.

In accordance with the present invention, an information recording disk having a large capacity, and a small deterioration against repeated reading out and writing in operations, can be provided. The present invention can provide an optical disk having a large capacity when manufacturing it with a conventional optical disk manufacturing process.

What is claimed is:

1. A glass comprising:

$SiO_2$, $Na_2O$, MgO, $Al_2O_3$ and cobalt oxide, wherein said cobalt oxide is 4.5–85 wt % as an oxide of CoO or 4.9–91 wt % as an oxide of $Co_3O_4$.

2. A glass according to claim 1, further comprising any one of a transition metal element and a rare earth element.

3. A glass according to claim 2, wherein said transition metal element is at least one element selected from the group consisting of Ti, V, Cr, Mn, Fe, Co, Ni and Cu, and said rare earth element is at least one element selected from the group consisting of Nd, Ce, Pr, Sm, Eu, Tb, Ho, Er and Tm.

4. A glass according to claim 1, further comprising CaO or $B_2O_3$, wherein the $SiO_2$ is 6–8 wt %, the alkaline oxide is equal to or less than 20 wt %, and the boron oxide is equal to or less than 30 wt %.

5. A glass according to claim 1, wherein the glass is block shaped or film shaped.

6. A method of manufacturing glass comprising the steps of:

melting powders of $SiO_2$, $Na_2O$, MgO, $Al_2O_3$ and cobalt oxide, and cooling the molten glass, wherein said cobalt oxide is 4.5–85 wt % as an oxide of CoO or 4.9–91 wt % as an oxide of $Co_3O_4$.

7. A method of manufacturing glass according to claim 6, wherein said melting step includes a step of heating the powders to approximately 1500° C., and said cooling step includes steps of cooling rapidly, reheating to approximately 600° C. and cooling gradually.

8. A method of manufacturing glass, comprising the steps of:

sintering powders of $SiO_2$, $Na_2O$, MgO, $Al_2O_3$ and cobalt oxide, and cooling the molten glass, wherein said cobalt oxide is 4.5–85 wt % as an oxide of CoO or 4.9–91 wt % as an oxide of $Co_3O_4$.

9. A method of manufacturing glass according to claim 8, wherein said sintering step includes a step of heating the powders to 1200° C. in the case of using CoO or to 900° C. in the case of using $Co_3O_4$.

* * * * *